United States Patent
Siebert et al.

(10) Patent No.: US 10,036,169 B2
(45) Date of Patent: *Jul. 31, 2018

(54) METHOD FOR PRODUCING PANELS AND PANEL PRODUCED ACCORDING TO THE METHOD

(71) Applicant: FLOORING TECHNOLOGIES LTD, Pieta (MT)

(72) Inventors: Axel Siebert, Roebel (DE); Frank Oldorff, Schwerin (DE)

(73) Assignee: FLOORING TECHNOLOGIES LTD., Kalkara (MT)

( * ) Notice: Subject to any disclaimer, the term of this patent is extended or adjusted under 35 U.S.C. 154(b) by 635 days.

This patent is subject to a terminal disclaimer.

(21) Appl. No.: 14/619,491

(22) Filed: Feb. 11, 2015

(65) Prior Publication Data

US 2015/0152651 A1    Jun. 4, 2015

Related U.S. Application Data

(62) Division of application No. 13/824,219, filed as application No. PCT/EP2010/005816 on Sep. 23, 2010, now Pat. No. 8,973,270.

(51) Int. Cl.
*E04F 15/10*    (2006.01)
*B32B 9/04*    (2006.01)
(Continued)

(52) U.S. Cl.
CPC ............ *E04F 15/107* (2013.01); *B32B 9/042* (2013.01); *B44C 5/043* (2013.01); *E04F 15/041* (2013.01);
(Continued)

(58) Field of Classification Search
CPC ...... E04F 15/107; E04F 15/102; B32B 9/042; B44C 5/043
See application file for complete search history.

(56) References Cited

U.S. PATENT DOCUMENTS 4,305,989 A * 12/1981 Luck ..................... B27N 7/00
                                                        264/113
4,503,115 A    3/1985 Hemels et al.
(Continued)

FOREIGN PATENT DOCUMENTS

AT          351744 B      8/1979
DE       19532819 A1      3/1997
(Continued)

OTHER PUBLICATIONS

AT351744 translation, Aug. 10, 1979.*
(Continued)

*Primary Examiner* — Samir Shah
*Assistant Examiner* — Jasper Saberi
(74) *Attorney, Agent, or Firm* — Andrew M. Calderon; Roberts Mlotkowski Safran Cole & Calderon, P.C.

(57) ABSTRACT

Floor panels include: an upper face, a lower face and two pairs of opposite side edges; a base coat layer, a primer layer, at least one decorative layer and a wear-resistant layer are applied at least to a press skin on the upper face; a base coat layer and a counteracting layer are applied to the lower face of the core; the upper face and the lower face of the core have the press skin that arose during pressing; the base coat layer has at least partly penetrated into the press skin on the upper face; the primer layer is arranged between the base coat layer and the decorative layer; the wear-resistant layer contains corundum particles and cellulose fibers; the decorative layer consists of a water-based paint; connecting mechanism and locking mechanism are attached to the side edges in order to connect and lock a plurality of panels without glue.

15 Claims, 1 Drawing Sheet

(51) Int. Cl.
*B44C 5/04* (2006.01)
*E04F 15/04* (2006.01)

(52) U.S. Cl.
CPC ....... *E04F 15/102* (2013.01); *Y10T 29/49629* (2015.01); *Y10T 29/49789* (2015.01); *Y10T 29/49801* (2015.01); *Y10T 29/49982* (2015.01); *Y10T 428/24008* (2015.01); *Y10T 428/24554* (2015.01)

(56) References Cited

U.S. PATENT DOCUMENTS

| | | | |
|---|---|---|---|
| 6,773,799 B1 | 8/2004 | Persson et al. | |
| 7,022,756 B2 | 4/2006 | Singer | |
| 7,459,493 B2 | 12/2008 | Singer | |
| 7,482,064 B2 | 1/2009 | Gerello | |
| 7,811,489 B2 | 10/2010 | Pervan et al. | |
| 8,349,235 B2 | 1/2013 | Pervan et al. | |
| 8,617,439 B2 | 12/2013 | Pervan et al. | |
| 8,632,875 B2 * | 1/2014 | Oldorff | B05D 7/08 29/527.2 |
| 2003/0136494 A1 * | 7/2003 | Windmoller | B27N 7/005 156/62.2 |
| 2004/0086693 A1 * | 5/2004 | Saldarelli | A63B 69/12 428/172 |
| 2004/0191547 A1 * | 9/2004 | Oldorff | E04F 15/02 428/479.3 |
| 2007/0094985 A1 * | 5/2007 | Grafenauer | E04F 15/02 52/582.1 |
| 2009/0155612 A1 * | 6/2009 | Pervan | B32B 21/02 428/498 |
| 2010/0055420 A1 | 3/2010 | Vermeulen | |
| 2010/0175343 A1 | 7/2010 | Kruesemann et al. | |
| 2011/0117340 A1 | 5/2011 | Oldorff | |
| 2017/0120474 A1 * | 5/2017 | Oldorff | B27N 7/005 |

FOREIGN PATENT DOCUMENTS

| | | |
|---|---|---|
| DE | 19751115 A1 | 5/1999 |
| EP | 1454763 A2 | 9/2004 |
| EP | 2236313 A1 | 10/2010 |
| JP | S57123038 | 7/1982 |
| WO | WO-03076146 A1 | 9/2003 |

OTHER PUBLICATIONS

Chinese Search Report for Chinese Patent Application No. 2010800692341, dated Jun. 27, 2014, 4 Pages.
English translation of International Preliminary Report on Patentability for Application No. PCT/EP2010/005816, 9 pages, dated Apr. 8, 2013.
English translation of EP 1454763 A2 obtained from Espace.net on Oct. 23, 2014.

* cited by examiner

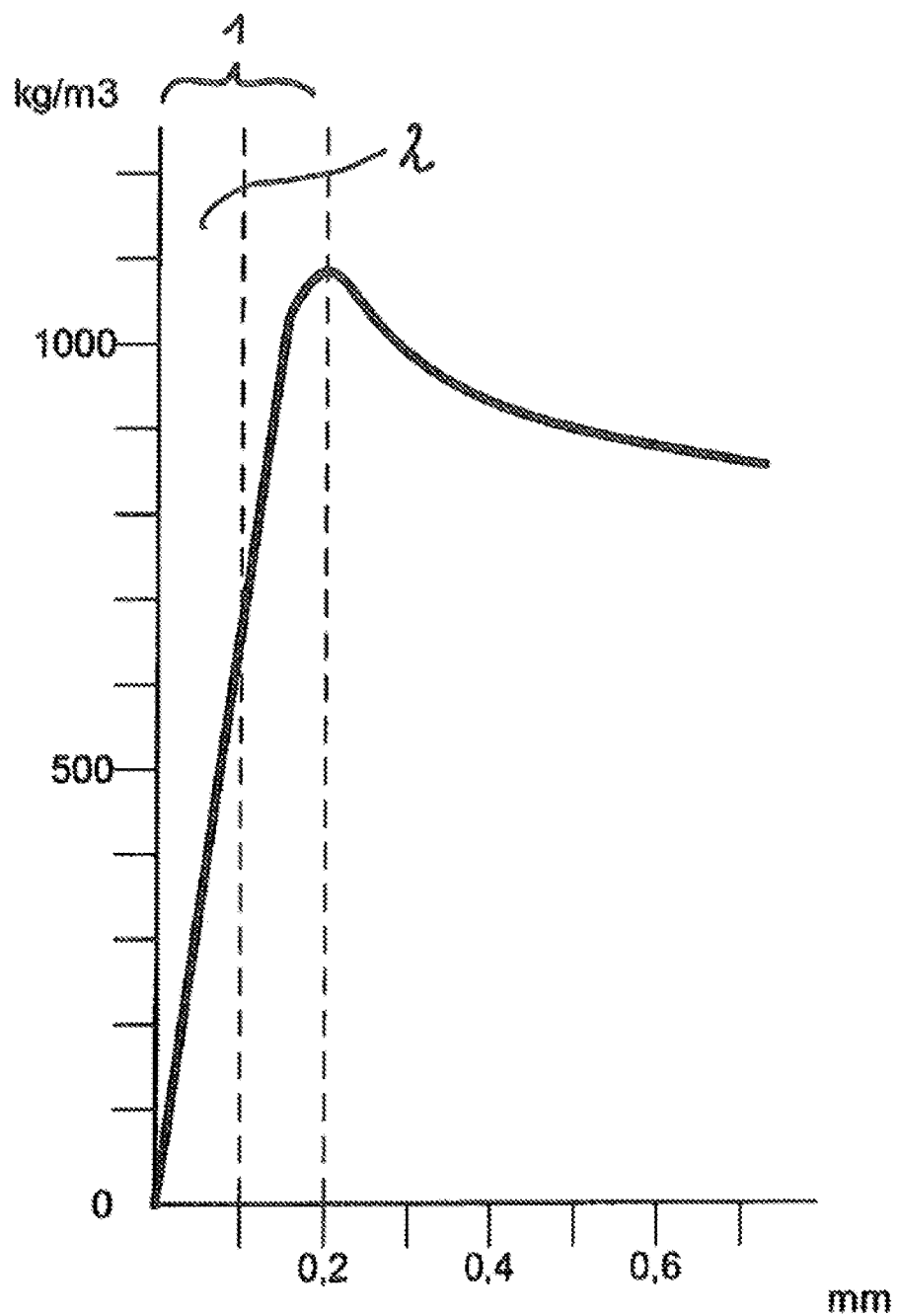

METHOD FOR PRODUCING PANELS AND PANEL PRODUCED ACCORDING TO THE METHOD

FIELD OF THE INVENTION

Method for producing panels and panel produced according to the method.

The invention relates to a method for producing panels, which are divided up from a large-format substrate board having a core of wood material.

BACKGROUND

EP 1 454 763 A2 discloses a method for finishing a wood or wood material board, in particular an MDF or HDF board, having an upper face and a lower face, in which, firstly, a sealing layer of melamine resin is applied to the upper face of the board, a decoration is printed onto the sealing layer and a protective layer of melamine resin is then applied to the decoration. The structure of the board is then pressed under the action of temperature until the protective layer and the sealing layer melt and are joined to each other with the inclusion of the printed decoration.

DE 195 32 819 A1 discloses a method for producing a wood material board having an optically configurable upper face, in which a base color, a seal, a printing base and a decorative print are applied successively to the wood material board. The printing base is built up from a base color or a base coat made of a paint seal and a surface paint. By means of engraved cylinders, a decorative print can be printed onto the printing base, for example in a two-color print. Finally, a multilayer acrylate UV paint, which can be cured by means of UV light, can be applied to this print.

DE 197 51 115 A1 discloses a method for coating a panel, in which at least one colored layer is applied to the upper face by means of a printing process, in particular by means of screen printing. The upper face can be untreated, polished or pre-treated, in particular painted. Finally, the colored layer applied can be covered by a coating with clear varnish.

If direct printing technology is used, that is to say the direct printing of the individual layers onto the substrate board, the result as compared with conventionally produced panels is a reduction in the thickness of the finished laminate panels as a result of the omission of the paper layers. This leads to problems during flow production when the large-format coated boards are subsequently divided up to produce the panels. In order that it is ensured that individual panels do not fall out of DIN 13329 as a result of an undersize of the thickness, a high level of quality assurance has to be provided, which firstly slows down production and secondly also increases the production costs. Ultimately, irritation also occurs at the dealer and/or end user, since the stack height of directly coated boards visibly differs from conventionally coated boards.

During the known board production, HDF boards are normally used as substrate boards, the upper face of which is ground off by about 0.3 mm. On the upper face and the lower face of the substrate board, a press skin is formed, which is also called press patina or decay layer. The press skin is produced as the fiber or chip cake is pressed and is produced by the hot upper face of the press platens or bands of the press. The press skin has a thickness of about 0.3 mm. Since the press skin is ground off completely and about 0.1 mm from the core material is ground off in order to reduce the roughness on the upper face of the substrate board before the further coating, the boards have to be produced thicker by a corresponding grinding allowance, which has a lasting influence on the production costs. In order to produce a flooring laminate meeting the standards, produced by means of direct printing technology and having a thickness of 6 mm, the substrate board must have a thickness of at least 6.1 mm.

The press skin therefore has to be ground off, since, in the area thereof, the input of heat during hot pressing is so high that the adhesive cures too quickly, as a result of which adhesive bonds at least partly break and make the applied layer susceptible. This breaking of the adhesive bonds makes finished panels susceptible to lifting of the decorative and wear-resistant layers applied to the substrate board. This lifting is called delamination, which can occur even under normal loading and from the change in size typical of wood materials on account of climatic fluctuations.

There is therefore a great need for wear-resistant laminate panels which lie within the thickness tolerance found in the above-mentioned standard. Furthermore, there is a need for a resource-preserving production method in which extra costs resulting from additional method steps and/or from additional materials are largely avoided.

In EP 2 236 313, which is not a prior publication, it is proposed to grind off only part of the press skin, specifically 0.1 mm thickness. As a result of this method, material savings of virtually 5% can be achieved, which means that wood, adhesive and some of the energy needed for the processing are saved. A 6 mm laminate panel meeting the standard can be produced by using the method described in this document from a substrate board which is 5.8 mm thick. In the case of a conventional production method, the substrate board must have a thickness of 6.1 mm.

SUMMARY

On the basis of this problem, the method described at the outset for producing panels, in particular flooring panels, is to be improved further.

In order to solve the problem, the method is distinguished by the following steps:

a) scattering glued wood fibers or wood chips to form a wood material cake, b) pressing the wood material cake at elevated temperature to form a large-format substrate board, which is provided press-finished and has a press skin that arose during the production of the substrate board, at least on the upper face thereof, c) applying a base coat made of a liquid melamine-based resin to the upper face of the substrate board, the resin at least partially penetrating into the top surface layer of the substrate board and at least partially penetrating and improving the region of the press skin, d) drying the base coat, e) applying a primer to the base coat, f) drying the primer, g) applying at least one water-based paint enriched with pigments in order to produce a decoration, h) drying the decoration, i) applying a seal made of at least one melamine-based resin enriched with wear-resistant particles and cellulose fibers, j) drying the seal, k) applying a base coat made of a liquid melamine-based resin to the lower face of the substrate board, the resin at least partially penetrating into the lower surface layer of the substrate board, l) drying the base coat, m) applying a counteracting layer to the lower face of the substrate board, n) pressing the layer structure under the action of pressure and temperature, o) dividing the substrate board into panels of the desired width and length, p) attaching connecting means and locking elements to opposite side edges in order to connect and lock a plurality of panels without glue to form a floatingly laid floor composite.

DESCRIPTION OF DRAWINGS

The drawing shows the extract from a bulk density profile of an HDF board for use for a floor covering

DETAIL DESCRIPTION OF INVENTION

It has been shown, by means of a base coat made of a liquid melamine-based resin, to which a primer is then applied, broken adhesive bonds can be repaired or compensated for in such a way that the subsequently applied layers are no longer susceptible to lifting.

The fact that the substrate board can be made thinner increases the speed of the hot press and therefore also the output thereof (quantity/unit time). Since the press skin no longer has to be ground off, not only is handling time omitted, which reduces the production time, but also the running costs for the abrasive belts are dispensed with. Since the layer of maximum raw thickness is maintained, the hot pressing can be carried out with less pressure and/or at a higher speed. The setting window for hot pressing in order to optimize the output consequently becomes wider.

As a result of the penetration of resin into the upper layer of the substrate board, firstly the properties of the press skin are compensated for and, at the same time, a good substructure for decoration and wear-resistant layer is created. In practice, it has been shown that the danger of delamination in the case of floor panels which have been produced in accordance with the invention is low. A considerable improvement in quality was achieved.

The substrate board preferably used is an MDF, HDF or chipboard.

The thickness of the substrate board preferably has a thickness between 4 and 12 mm, in particular preferably of 5.8 mm, and the press skin preferably has in particular a thickness of about 0.2 mm.

The wettability of the upper face of the press-finished substrate board can preferably also be adjusted by an additive being put onto the upper face of the wood material cake before the pressing. This additive is preferably put on immediately before the wood material cake runs into the hot press (for example a Conti press).

The additive is preferably a surfactant or consists of surfactants and further constituents. In particular it is preferably present in liquid form.

The further constituents of the additive, in addition to surfactants, can be biocides, stabilizers and/or polymers. The proportion of surfactants is preferably greater than 90%.

Practical trials have resulted in a good action being achieved if the additive is applied in a quantity of 1 to 30 mg/m$^2$, distributed uniformly on the upper face of the wood material cake.

Corundum particles are preferably used as wear-resistant particles in the sealing layer.

Following the division, a plurality of panels can be packed to form a bundle.

A panel having a core of wood fibers or chips is distinguished by the following features:

a) an upper face, a lower face and two pairs of opposite side edges, b) the upper face and the lower face of the core have a press skin that arose during pressing, c) a base coat layer, a primer layer, at least one decorative layer and a wear-resistant layer are applied at least to the press skin on the upper face, d) a base coat layer and a counteracting layer are applied to the lower face of the core, e) the base coat layer has at least partly penetrated into the press skin on the upper face.

The base coat layer preferably consists of a melamine resin. An additive can be applied to the base coat layer on the press skin, preferably at least on the upper face.

The wear-resistant layer preferably has, in addition to cellulose fibers, corundum particles as wear-resistant particles.

The technology according to the invention applies to panel thicknesses from 4 to 12 mm.

The method according to the invention is to be explained by way of example below for a 6 mm flooring laminate satisfying DIN 13329.

Firstly, wood shreds are pulped to form fibers or comminuted to form chips. The fibers or chips are then glued with a glue, for example melamine resin. By using a scattering device, the glued and dried wood fibers or wood chips are scattered onto a continuously circulating conveyor belt to form a wood material cake. The fibers or chips can be scattered in several layers. The alignment of the chips can be offset by 90° in mutually adjacent layers. The scattered wood material cake is fed via the conveyor belt to a Conti press, in which the glued wood fibers or wood chips are pressed under high pressure and at high temperature to form a large-format substrate board, preferably with a thickness of about 5.8 mm. Immediately before the wood material cake runs into the press, the upper face of the wood material cake can be wetted uniformly with an additive. The additive is applied in a quantity of about 1 to 30 mg/m$^2$. It consists of a surfactant or surfactants with further constituents, such as biocides, stabilizers and/or polymers for example. The additive can be scattered on if it is present in powdered form or sprayed on if it is liquid. Following the pressing of the wood material cake, the substrate board is provided on its upper face and its lower face with a press skin, which has arisen as a result of the hot metal press boards during the pressing of the fiber or chip cake. The press skin is then primed with a liquid melamine-based resin in order to adjust the wettability of the upper face. The resin penetrates with its curable constituents at least partly into the upper surface layer and penetrates the press skin by up to 0.2 mm. As a result, the press skin is improved.

A drying operation is then carried out. A primer layer is applied to the dried base coat and then dried. At least one water-based paint enriched with colored pigments is applied to the dry primer layer in order to produce a decoration. The decoration can be plain colors, a wood grain, a mirror tile or a fantasy decoration. Natural stone decorations can also be imagined. After the applied decorative layer has been dried, a seal having at least one resin enriched with wear-resistant particles and cellulose fibers is applied. The resin is built up on a melamine basis. The applied seal is then dried and then the lower face of the substrate board is primed with a liquid melamine-based resin, the resin diffusing at least partly into the lower surface layer and possibly the lower press skin. The base coat is then dried completely and a liquid synthetic resin layer is spread onto the lower face of the substrate board as a counteracting layer. This layer structure is then pressed under the action of pressure and temperature.

The large-format substrate board finished in this way is then divided up into panels of desired size. The opposite side edges of the divided panels are then profiled with mutually corresponding connecting means and locking elements in order that a plurality of identically formed panels can be connected to one another and locked to one another, in order to produce a floatingly-laid flooring composite.

A plurality of divided panels is packed in a known way to form a bundle and, if appropriate, put into store.

It is generally known that, in the case of direct coating, that is to say the liquid application of decorative and/or wear-resistant layers to the upper face of a substrate board made of MDF/HDF, because of the different absorption capacity over the board upper face, undesired decor deviations occur, which generally become visible only following the lamination. For this are the inhomogeneities of the wood material board themselves which, for the major part, result from fluctuating wood formulations from which the fibers as a main constituent of an MDF/HDF board are produced. These fluctuations result, for example, from seasonal and territorial availability and from the type of wood itself, in particular from the density and the pH of the specific wood and from the state of the wood. Ideally, a wood formulation would have no density and/or pH fluctuations. For example, beech requires about 60 kWh/t during defibering, whereas pine needs about 120 kWh/t. During the processing, in the worst possible case fibers result from the pine, whereas virtually dust-sized particles arise from the beech. During the hot pressing, the inhomogeneous MDF/HDF boards previously represented as disadvantageous arise. The additive which can be put on before the wood material cake runs into the press platen influences the wettability of the board upper face, as already explained. The result is also a uniform absorption capacity of the board upper face, so that it is no longer possible for the previously known undesirable decor deviations to occur.

The drawing shows the extract from a bulk density profile of an HDF board for use for a floor covering. The region designated by 1 is what is known as the decay layer (press skin), which was ground off in conventional boards. The region designated by 2 represents the region which contains the optional additive. In the graph, the bulk density is specified in kilograms per $m^3$ and the board thickness in millimeters. It can clearly be seen that the bulk density within the press skin rises rapidly into a range of more than 1000 kg per $m^3$ and then falls again in the core toward the core center.

What is claimed:

1. A panel having a pressed core made of wood material, in particular of fibers or chips, comprising:
   a) an upper face, a lower face and two pairs of opposite side edges,
   b) a base coat layer, a primer layer, at least one decorative layer and a wear-resistant layer are applied at least to a press skin on the upper face,
   c) a base coat layer and a counteracting layer are applied to the lower face of the core,
   d) the press skin of the upper face and a press skin of the lower face of the core arose during pressing,
   e) the base coat layer on the upper face has at least partly penetrated into the press skin on the upper face,
   f) the primer layer is arranged between the base coat layer on the upper face and the decorative layer,
   g) the wear-resistant layer contains corundum particles and cellulose fibers,
   h) the decorative layer consists of a water-based paint,
   i) connecting mechanism and locking mechanism are attached to the side edges in order to connect and lock a plurality of panels without glue.

2. The panel according to claim 1, further comprising an additive applied to the press skin under the base coat layer, at least on the upper face.

3. The panel according to claim 2, wherein the additive is a surfactant or comprises surfactants and further constituents.

4. The panel according to claim 3, wherein the further constituents are biocides, stabilizers and/or polymers.

5. The panel according to claim 3, wherein a proportion of the surfactants is greater than 90%.

6. The panel according to claim 2, wherein the additive is applied in a quantity of 1 to 30 $mg/m^2$, distributed uniformly on the upper face.

7. The panel according to claim 6, wherein the press skin on the upper face is primed with a liquid melamine-based resin which penetrates with its curable constituents at least partly into the upper face and penetrates the press skin on the upper face by up to 0.2 mm.

8. The panel according to claim 7, wherein a seal having at least one resin enriched with wear-resistant particles and cellulose fibers is applied to the upper face.

9. The panel according to claim 8, wherein a liquid synthetic resin layer is spread onto the lower face as the counteracting layer, wherein the liquid synthetic resin layer diffuses at least partly into the press skin of the lower face.

10. The panel according to claim 1, wherein a region of the press skin contains an additive.

11. The panel according to claim 1, wherein the panel has a thickness of 4 to 12 mm.

12. The panel according to claim 1, wherein the base coat of the upper face comprises a melamine-based resin.

13. The panel according to claim 1, wherein the water-based paint is enriched with colored pigments.

14. The panel according to claim 1, wherein the counteracting layer comprises synthetic resins.

15. The panel according to claim 1, wherein the core made of wood material is an MDF, HDF or chipboard.

* * * * *